(12) United States Patent
Park

(10) Patent No.: US 7,750,999 B2
(45) Date of Patent: Jul. 6, 2010

(54) LIQUID CRYSTAL DISPLAY DEVICE AND METHOD OF MANUFACTURING THE SAME

(75) Inventor: Seung Ryull Park, Bucheon-si (KR)

(73) Assignee: LG. Display Co., Ltd., Seoul (KR)

( * ) Notice: Subject to any disclaimer, the term of this patent is extended or adjusted under 35 U.S.C. 154(b) by 1541 days.

(21) Appl. No.: 11/025,738

(22) Filed: Dec. 29, 2004

(65) Prior Publication Data

US 2005/0140858 A1    Jun. 30, 2005

(30) Foreign Application Priority Data

Dec. 30, 2003   (KR) ...................... 10-2003-0099756

(51) Int. Cl.
*G02F 1/1333*   (2006.01)
*G02F 1/1339*   (2006.01)

(52) U.S. Cl. ....................................... 349/110; 349/156

(58) Field of Classification Search ................ 349/110, 349/111, 155, 156

See application file for complete search history.

(56) References Cited

U.S. PATENT DOCUMENTS

| 6,031,593 | A  | * | 2/2000 | Morikawa et al. | ........... 349/155 |
| 6,473,145 | B1 | * | 10/2002 | Shim et al. | .................. 349/113 |
| 6,774,975 | B2 | * | 8/2004 | Ahn | ............................ 349/156 |
| 6,809,338 | B2 | * | 10/2004 | Murade | ....................... 257/72 |
| 2006/0017862 | A1 | * | 1/2006 | Song et al. | .................... 349/42 |

* cited by examiner

*Primary Examiner*—David Nelms
*Assistant Examiner*—David Y Chung
(74) *Attorney, Agent, or Firm*—Brinks Hofer Gilson & Lione

(57) ABSTRACT

A liquid crystal display device includes opposing substrates. One of the substrates has a thin film transistor and a color filter formed thereon. A spacer formed between the substrates maintains a cell gap. A light shielding layer is formed at a lower portion of the spacer and overlaps the thin film transistor. The light shielding layer has a pattern substantially identical to the spacer. The light shielding layer and the spacer are simultaneously formed using the same photolithographic process steps.

27 Claims, 22 Drawing Sheets

LIQUID CRYSTAL DISPLAY DEVICE AND METHOD OF MANUFACTURING THE SAME

This application claims the benefit of Korean Patent Application No. P2003-99756 filed in Korea on Dec. 30, 2003, which is hereby incorporated by reference.

BACKGROUND

1. Technical Field

The present invention relates to a liquid crystal display device and more particularly, to a liquid crystal display device and a method of manufacturing the same capable of reducing the number of processes by forming a light shielding layer through the use of a mask process used to form a spacer.

2. Description of the Related Art

Recently, with an increasingly information-oriented society, a flat panel display device is needed that is light, thin and has low power consumption. Among the flat panel display devices, liquid crystal display devices have excellent resolutions, color displays and picture qualities, etc. Thus, liquid crystal display devices are used in notebook monitors or desktop monitors.

In general, the liquid crystal display device includes two substrates, each of which has an electrode formed at one side thereof. The two substrates are arranged so that the surfaces having the electrodes face each other. A liquid crystal material is injected between the substrates. After that, an electric field generated when a voltage is applied to the electrodes causes movement of a liquid crystal molecule. Accordingly, a transmittance of light becomes different, to thereby display a picture.

A lower glass of the liquid crystal display device is employed as an array substrate including a thin film transistor for applying a signal to a pixel electrode, and is formed by repeatedly making a thin film and performing photolithography and etching with respect to the thin film. An upper glass of the liquid crystal display device is employed as a substrate including a common electrode and a color filter. The color filter includes three colors of red R, green G and blue B which are sequentially arranged on the upper glass.

Such a liquid crystal display device is made by a sequential process of separately forming a thin film transistor array substrate and a color filter array substrate, and arranging the pixel electrode of the thin film transistor array substrate and the color filter of the color filter array substrate to correspond with each other in a one-to-one relationship. However, misalignment occurs during the process of arranging the substrates, which causes problems such as light leakage. In order to prevent these problems, the upper glass may be made to have a black matrix with a wide width. However, in this case, an aperture ratio of the liquid crystal display device is lowered.

Thus, in order to prevent the misalignment of the liquid crystal display device and improve the aperture ratio, a method of forming the color filter on the thin film transistor array substrate has been proposed recently. The color filter on an upper thin film transistor is referred to as a color filter on thin film transistor (COT) structure.

FIG. 1 is a sectional view illustrating a liquid crystal display device having a related art COT structure.

As shown in FIG. 1, a gate electrode 12 made of a conductive material such as a metal is formed on a first transparent substrate 11. The gate electrode 12 is covered by a gate insulating film 13 made of silicon nitride ($SiN_x$) or silicon oxide ($SiO_2$) on the gate electrode 12.

An active layer 14 made of amorphous silicon is formed to be overlapped with the gate electrode 12 on the gate insulating film 13. An ohmic contact layer 15 made of amorphous silicon having a doped impurity is formed on the active layer 14.

A source electrode 16a and a drain electrode 16b made of conductive materials such as metals are formed on an upper portion of the ohmic contact layer 15. The source electrode 16a and the drain electrode 16b along with the gate electrode 12 constitute a thin film transistor T.

Meanwhile, the gate electrode 12 is connected to a gate line (not shown), the source electrode 16a is connected to a data line (not shown). The gate line and the data line cross each other, to thereby define a pixel region.

A first passivation film 17, which is made of silicon nitride, silicon oxide or an organic insulating film, is formed on an entire surface of the first substrate 11 including the source electrode 16a and the drain electrode 16b. The first passivation film 17 is used for protecting the thin film transistor T.

A black matrix 22 is formed at a location corresponding to the thin film transistor T, on the first passivation film 17. The black matrix 22 has an aperture at a portion corresponding to the pixel electrode 20 and is formed on an entire surface of the substrate. Thus, the black matrix 22 prevents light leakage resulting from tilting of the liquid crystal molecule at a portion besides the pixel electrode. Further, the black matrix 22 shields light incident to a channel portion of the thin film transistor T to prevent generation of a light leakage current.

A color filter 18 is formed at the pixel region on the first passivation film 17. In the color filter 18, red, green and blue colors are arranged in sequence, and each color corresponds to one pixel region. The color filter 18 is formed at a portion corresponding to the drain electrode 16b to be exposed via a contact hole 19. A second passivation film 13 made of an inorganic insulating film such as silicon oxide or silicon nitride, or an organic insulating film such as an acrylic system resin or BCB (benzocyclobutene) is formed on the color filter 18. The second passivation film 24 serves to prevent the liquid crystal material from being contaminated by the color filter 18.

A contact hole 19 is formed to pass through the second passivation film 24 and the first passivation film 17 to expose the drain electrode 16b. The pixel electrode 20 electrically connected to the drain electrode 16b via the contact hole 19 is formed at the pixel region of the second passivation film 24, wherein the pixel electrode is made of a transparent conductive material. Also, a spacer 25 is formed at a portion corresponding to the thin film transistor T, on the second passivation film 24.

Meanwhile, a second transparent substrate 21 is arranged on an upper portion of the first substrate 11 and is separated from the first substrate 11 by a defined distance by the spacer 25. A common electrode 23 made of a transparent conductive material is formed on the second substrate 21.

The first substrate 11 is combined with the second substrate 21, and a liquid crystal layer 30 is injected between the pixel electrode 20 and the common electrode 23. An array state of the liquid crystal molecule of the liquid crystal layer 30 is changed by an electric field generated when a voltage is applied to both the pixel electrode 20 and the common electrode 23. An alignment film (not shown) is formed at each of an upper portion of the pixel electrode 20 and a lower portion of the common electrode 23, to thereby determine an initial array state of the liquid crystal molecule.

As set forth above, the color filter 19 is formed on the same first substrate 11 (i.e., the lower glass) on which the thin film transistor T is formed, to thereby prevent misalignment of the color filter 18 and the pixel electrode 20 when the first substrate is combined with the second substrate 21 (i.e., the upper glass). Thus, even though the black matrix 22 is not wide, the aperture of the liquid crystal display device can be improved.

FIGS. 2A to 2F are sectional views illustrating a method of fabricating the array substrate for the related art liquid crystal display device.

Referring to FIG. 2A, a metallic material is deposited on the first substrate 11 and is patterned by way of photolithography, to thereby form the gate electrode 12. When the gate electrode 12 is formed, a gate line (not shown) connected to the gate electrode 12 and extending in a first direction is also formed along with the gate electrode 12.

Silicon nitride or silicon oxide is deposited on an entire surface of the first substrate 11 so as to cover the gate electrode 12, to thereby form the gate insulating film 13. Also, an amorphous silicon layer and an amorphous silicon layer doped with an impurity are sequentially deposited on the gate insulating film 13. And then, the active layer 14 and the ohmic contact layer 15 are formed by patterning by way of photolithography so that the active layer 14 and the ohmic contact layer 15 overlap the gate electrode 12 and overlap at least a portion of the source electrode 16a and a partial drain electrode 16b through a width wider than the gate electrode 12.

Referring to FIG. 2B, a metallic material is deposited on an entire surface of the first substrate 11 and then is patterned by way of photolithography, to thereby form the source electrode 16a and the drain electrode 16b. When the source electrode 16a and the drain electrode 16b are formed, the data line (not shown) defining the pixel region along with the gate line is also formed. The data line is connected to the source electrode 16a and extends in a second direction crossing the gate line. At this time, the ohmic contact layer 15 between the source electrode 16a and the drain electrode 16b is patterned and then is removed.

The source electrode 16a and the drain electrode 16b along with the gate electrode 12 constitute the thin film transistor T.

Referring to FIG. 2C, an inorganic insulating film such as silicon oxide or silicon nitride is deposited, or an organic insulating film such as an acrylic resin is coated, on the source and the drain electrodes 16a and 16b, to thereby form the first passivation film 17.

A black matrix material is deposited on the first passivation film 17 and then is patterned by photolithography and etching, to thereby form the black matrix 22. A photosensitive material capable of filtering red R, green G and/or blue colors is applied to the first passivation film 17 and then is patterned by an exposure process and a developing process, to thereby form the color filter 18 at the pixel region including the transistor T. The color filter 18 includes red, green and blue colors, so that the procedure of applying, exposing and developing is repeated three times. Thus, a color filter 18 representing each color can be formed. The color filter 18 is formed at a portion corresponding to the drain electrode to be exposed via the contact hole 19.

Referring to FIG. 2D, an inorganic insulating film such as silicon oxide or silicon nitride is deposited, or an organic insulating film such as an acrylic resin or a BCB (benzocyclobutene) is coated, on the color filter 18, to thereby form the second passivation film 24.

And then, the first and the second passivation films 17 and 24 are sequentially patterned by way of photolithography, to thereby form the contact hole 19.

Referring to FIG. 2E, a transparent conductive material is deposited on the second passivation film 24 and then is patterned by way of photolithography, to thereby form the pixel electrode 20. The pixel electrode 20 corresponds to the color filter 18 in a one-to-one relationship and is electrically connected to the drain electrode 16b via the contact hole 19.

Thereafter, a spacer 25 made of a resin is formed at a portion corresponded to the thin film transistor T on the second passivation film 24. A resin is applied to the second passivation film 24 and the pixel electrode 20 and then is exposed and developed to remain at a portion corresponding to the thin film transistor T, to thereby form the spacer 25.

The thin film transistor T, the color filter 18 and the pixel electrode 20 are formed on the first substrate 11, to thereby complete the lower array substrate of the liquid crystal display device.

Referring to FIG. 2F, a transparent conductive metal is deposited on an entire surface of the second substrate 21, to thereby form the common electrode 23.

The common electrode 23 is formed on the second substrate 21, to thereby complete the upper array substrate.

Although not shown in FIG. 2, the upper glass is combined with the lower glass, and the liquid crystal material is injected into a space formed by the spacer 25, to thereby form the liquid crystal layer 3.

However, the above-mentioned liquid crystal display device requires a separate photolithographic process for forming the black matrix so that the channel portion of the thin film transistor T is not exposed to light. Further, the black matrix is overlapped with at least one of the gate line, the data line and the thin film transistor T with the first passivation film 17 therebetween, to thereby result in a parasitic capacitor. The parasitic capacitor has a relatively high capacitance as the first passivation film 17 is made of an inorganic insulating material having a high dielectric constant, which distorts a gate signal supplied to the thin film transistor T via the gate line and a data signal supplied to the thin film transistor T via the data line.

SUMMARY

Accordingly, a liquid crystal display device and a method of manufacturing the same is provided that reduces the number of processes by forming a light shielding layer through the use of a mask process used to form a spacer.

By way of introduction only, in one embodiment, a liquid crystal display device includes: a first array substrate; a second array substrate facing the first array substrate and having a thin film transistor and a color filter formed thereon; a spacer formed between the first and the second array substrates to maintain a cell gap between the first and the second array; and a light shielding layer with a pattern substantially identical to the spacer formed at a lower portion of the spacer and overlapped with the thin film transistor.

The light shielding layer may comprise a multiple layer structure containing a first layer having a low reflection material and a second layer having an opaque material.

The spacer may include first and second spacers of different heights.

In a second embodiment, the liquid crystal display device includes a light shielding layer having a footprint substantially identical (identical to or nearly identical to) to that of the spacer. The light shielding layer is formed between the spacer and the thin film transistor and overlaps the thin film transistor.

The light shielding layer may contact the color filter or may be formed on a passivation film between the spacer and the passivation film. In the latter case, the color filter may be formed on the thin film transistor or vice-versa. In either case, the light shielding layer may completely overlap a channel of the thin film transistor and/or be formed only between the spacer and the passivation film.

An additional light shielding layer may be formed between the thin film transistor and the base substrate. In this case, the color filter may be formed between the thin film transistor and the additional light shielding layer and/or both the light shield layer and the additional light shielding layer completely overlap the transistor channel.

In a third embodiment, a method of fabricating a liquid crystal display device includes simultaneously forming the spacer and the light shielding layer. The spacer maintains a cell gap between the first and second array substrates. The light shielding overlaps the transistor at a lower portion of the spacer.

Simultaneously forming the spacer and the light shielding layer may include sequentially forming a photosensitive light shielding material and a photosensitive organic insulating material, patterning the organic insulating material through photolithography using a partial exposure mask to form spacers having different heights, and etching the light shielding material using the spacer as a mask to form the light shielding layer.

Simultaneously forming the spacer and the light shielding layer may in addition or alternatively include over-etching the light shielding layer such that the light shielding layer has a width narrower than that of the spacer and heat-treating a substrate having the light shielding layer and the spacer such that the spacer covers the light shielding layer.

BRIEF DESCRIPTION OF THE DRAWINGS

The following detailed description of the embodiments of the present invention reference the accompanying drawings, in which.

DETAILED DESCRIPTION

Reference will now be made in detail to the embodiments of the present invention, examples of which are illustrated in the accompanying drawings.

Hereinafter, the embodiments of the present invention will be described in detail with reference to FIGS. 3 to 9.

Figure 1:
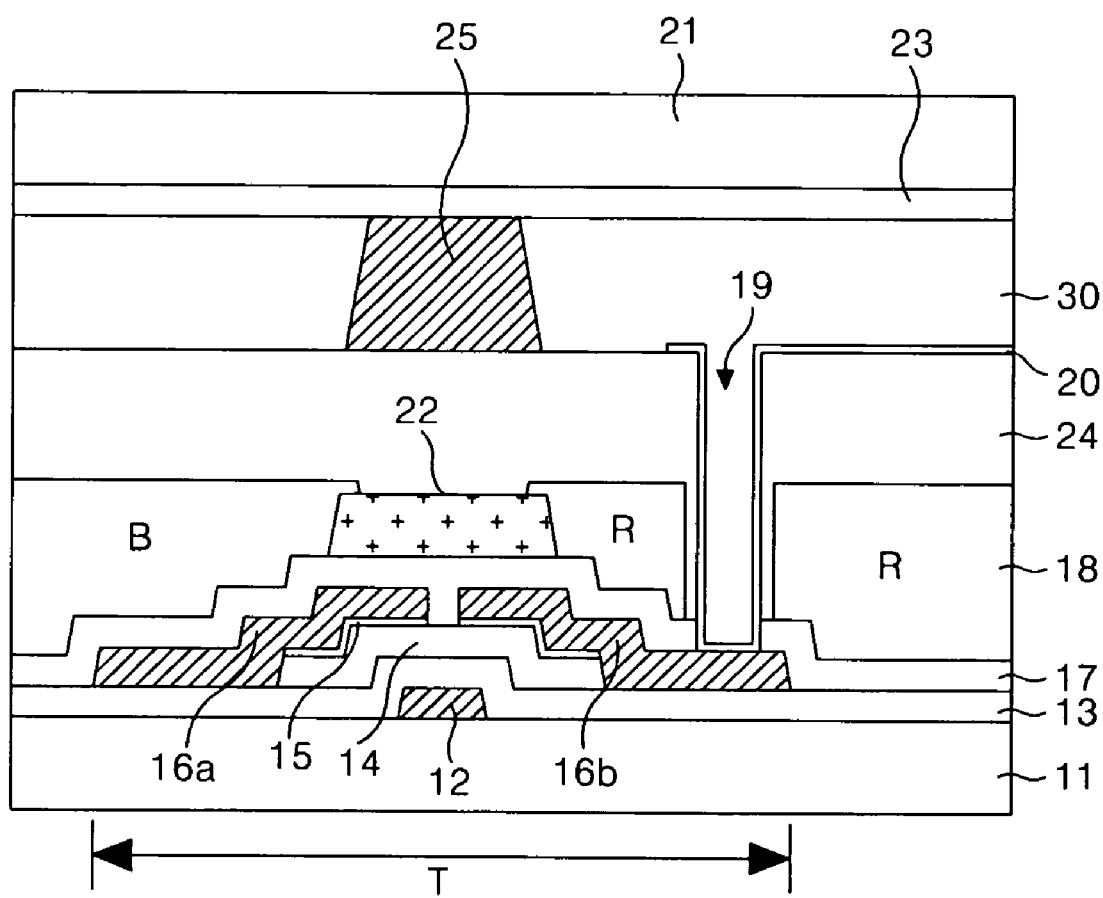
FIG. 1 is a sectional view illustrating a liquid crystal display device having a related art COT structure.
Figure 2A:
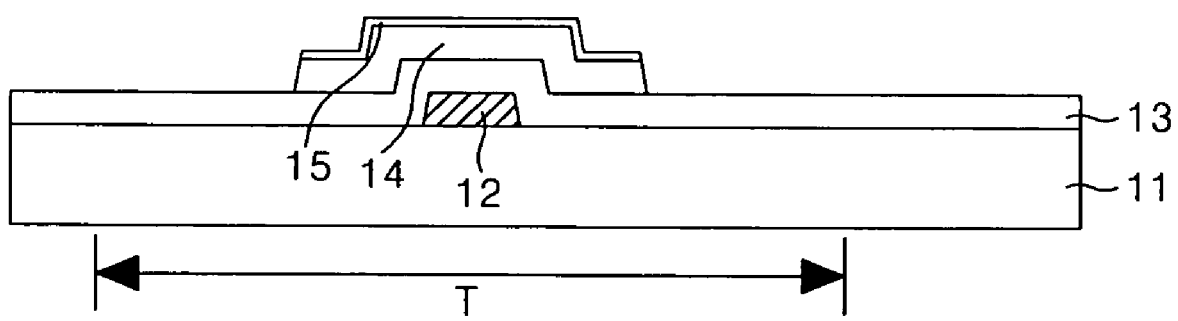
FIGS. 2A to 2F are sectional views illustrating a method of fabricating the array substrate for the related art liquid crystal display device.
Figure 2B:
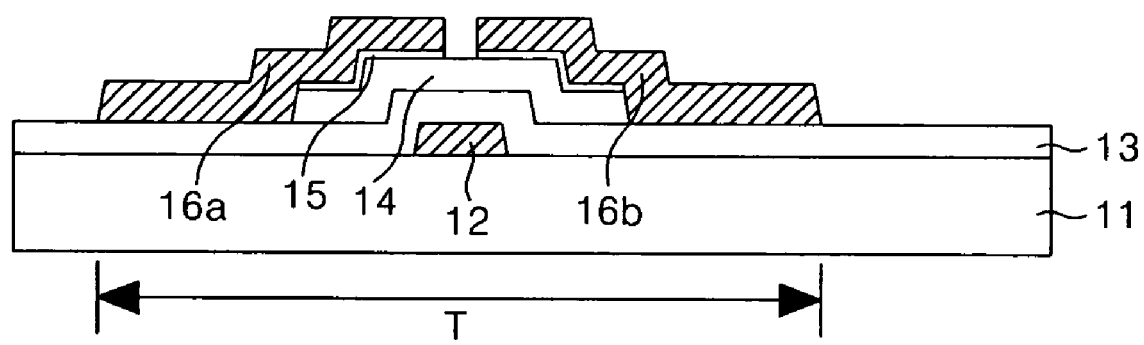
Figure 2C:
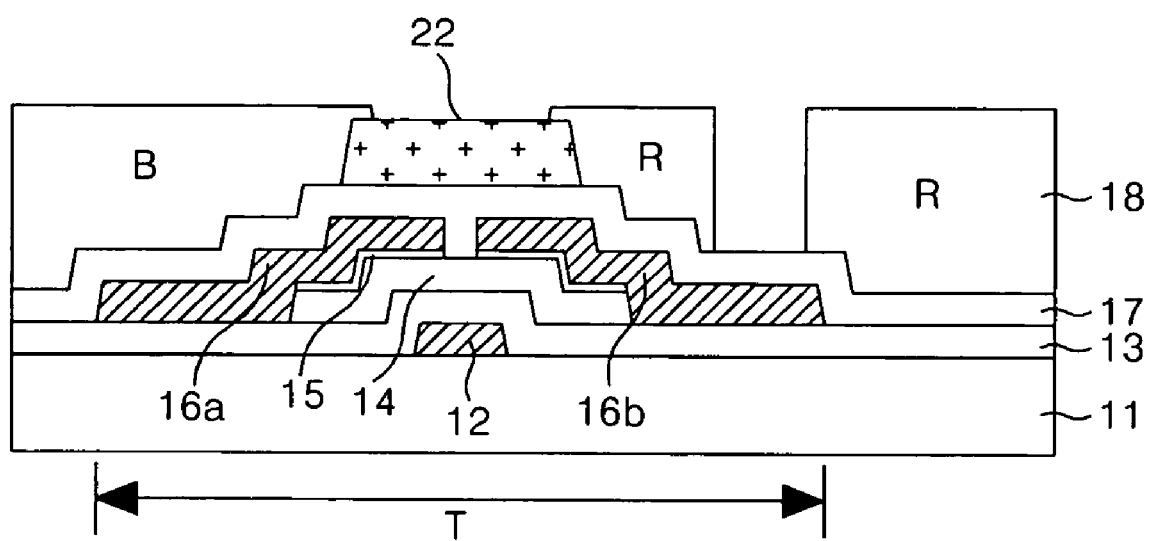
Figure 2D:
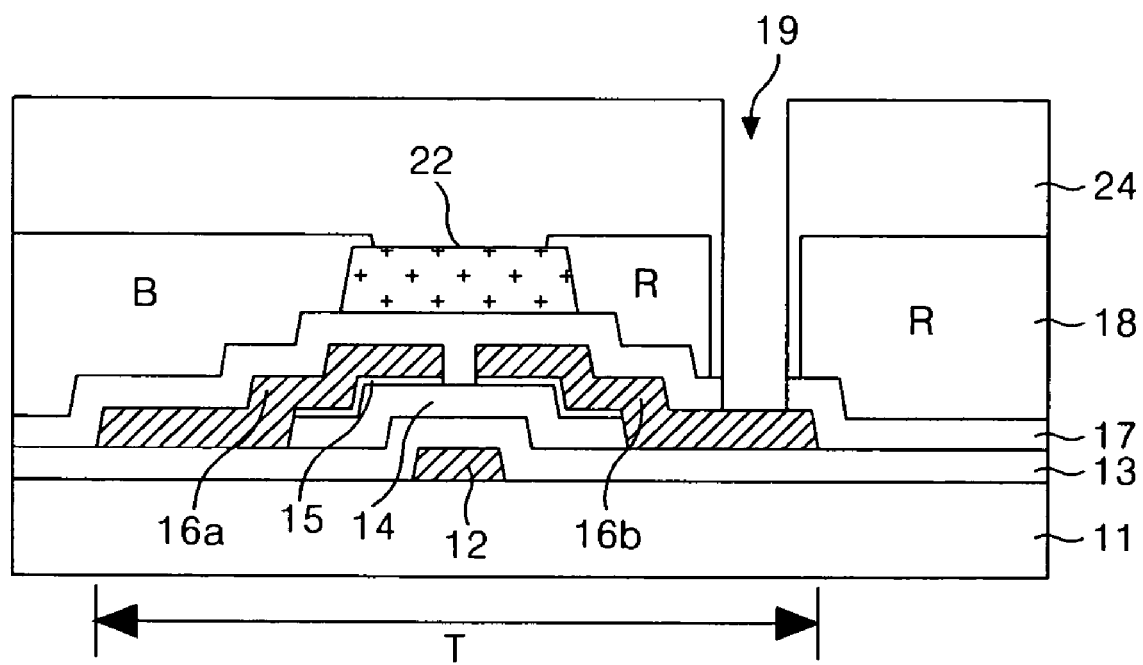
Figure 2E:
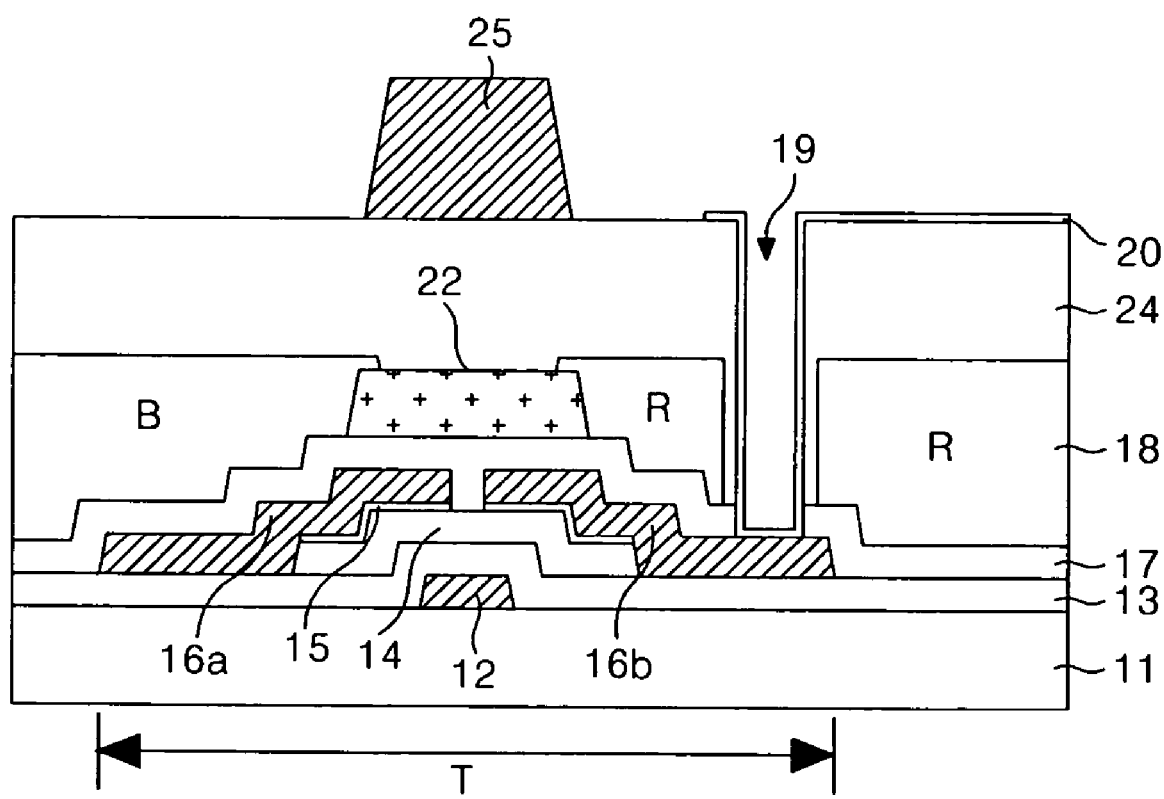
Figure 2F:
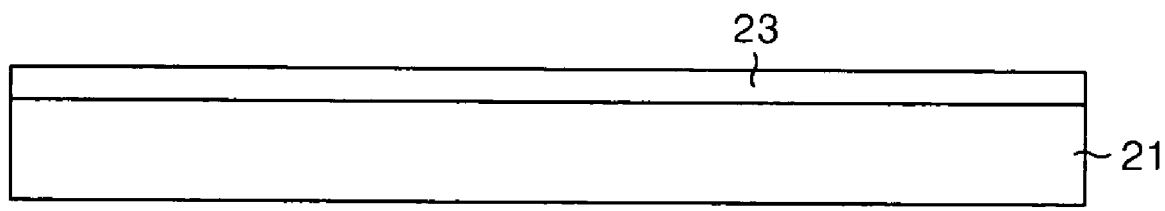
Figure 3:
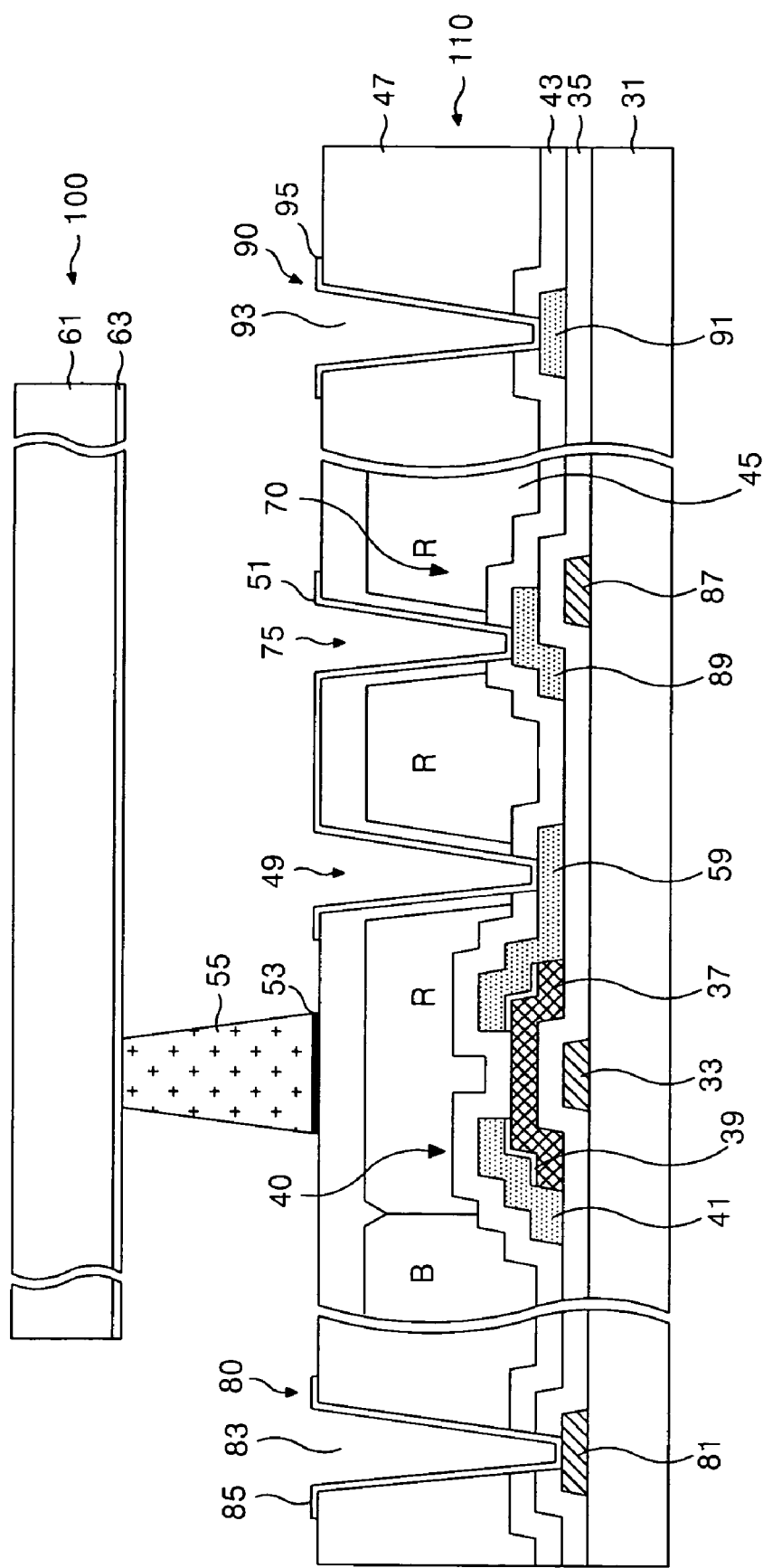
FIG. 3 is a sectional view illustrating a liquid crystal display device having a COT structure according to a first embodiment of the present invention.

FIG. 3 is a sectional view illustrating a liquid crystal display device having a COT structure according to a first embodiment of the present invention.

The liquid crystal display device shown in FIG. 3 includes a first array substrate 100 and a second array substrate 110 facing each other with a spacer 55 therebetween. The spacer 55 is formed with a pattern identical to that of a light shielding pattern 53.

The second array substrate 110 includes: a thin film transistor 40 formed at an intersection of a gate line 87 and a data line; pixel electrode 51 connected to the thin film transistor 40; a storage capacitor 70 formed at an overlapped portion of the gate line 87 and a storage electrode 89; a gate pad 80 connected to the gate line 87; and a data pad 90 connected to the data line.

The thin film transistor 40, in response to the gate signal of the gate line 87, allows a pixel signal of the data line to be charged in the pixel electrode 51. To this end, the thin film transistor 40 includes a gate electrode 33 connected to the gate line 87, a source electrode 41 connected to the data line and a drain electrode 59 connected to the pixel electrode 51. Further, the thin film transistor 40 includes an active layer 37 overlapping the gate electrode 33 with a gate insulating film 35 positioned between the active layer 37 and the gate electrode 33, and defining a channel between the source electrode 41 and the drain electrode 59. On the active layer 37, an ohmic contact layer 39 for making an ohmic contact with the source electrode 41 and the drain electrode 59 is further formed.

A first passivation film 43 is formed in order to protect the thin film transistor 40. Next, a color filter 45 is formed at the pixel region besides a pad region having the gate pad 80 and the data pad 90 on the first passivation film 43. In the color filter 45, red, green and blue colors are sequentially arranged and each color corresponds to one pixel region. The color filter 45 is formed at respective portions corresponding to the drain electrode 59 and the storage electrode 89 being exposed via a first contact hole 49 and a second contact hole 75. Also, a second passivation film 47 made of an inorganic insulating film such as silicon oxide or silicon nitride, or an organic insulating film such as an acrylic resin or BCB (benzocyclobutene) is formed on the color filter 45. The second passivation film prevents the liquid crystal material from being contaminated by the color filter 45.

The pixel electrode 51, which is connected to the drain electrode 59 of the thin film transistor 40 via the first contact hole 49 passing through the first passivation film 43 and the second passivation film 47, is formed in the pixel region.

The storage capacitor 70 includes the gate line 87 and a storage electrode 89 overlapping the gate line 87 with the gate insulating film 35 positioned therebetween. Herein, the storage electrode 89 is connected to the pixel electrode 51 via the contact hole 75 passing through the first passivation film 43, the color filter 45 and the second passivation film 47. The storage capacitor 70 allows the pixel signal charged in the pixel electrode 51 to be maintained stably until the next pixel signal is charged.

The gate pad 80 is connected to a gate driver (not shown) and supplies a gate signal to the gate line 87. The gate pad 80 includes a lower gate pad electrode 81 extending from the gate line 87, and an upper gate pad electrode 85 connected, via a third contact hole 83 passing through the gate insulating film 35 and the first and the second passivation films 43 and 57, to the lower gate pad electrode 81.

The data pad 90 is connected to a data driver (not shown) and supplies a data signal to the data line. The data pad 90 includes a lower data pad electrode 91 extending from the data line, and an upper data pad electrode 95 connected, via a fourth contact hole 93 passing through the first and the second passivation films 43 and 47, to the lower data pad electrode 91.

The first array substrate 100 is made of a transparent conductive material on an upper glass 61 and includes a common electrode 63 forming an electric field along with the pixel electrode 51.

The spacer 55 and the light shielding layer 53 are simultaneously patterned and formed by the same photolithographic method at a portion corresponding to the thin film transistor 40.

Figure 4A:
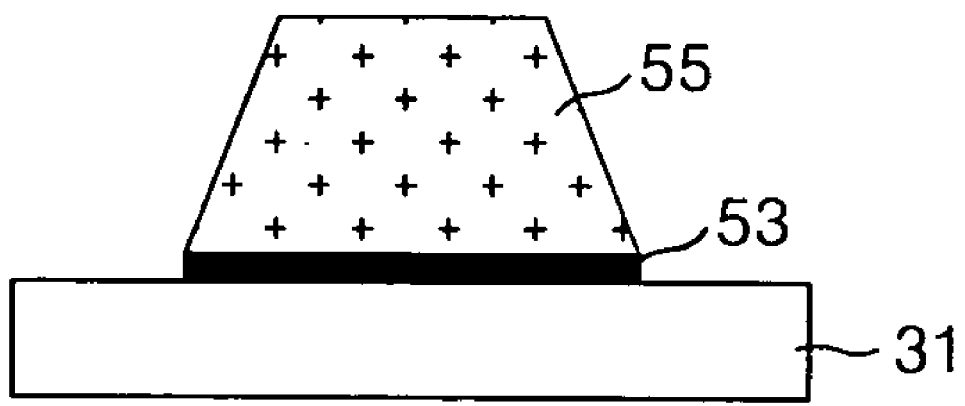
FIGS. 4A to 4C are sectional views illustrating various types of a spacer shown in FIG. 3.
Figure 4B:
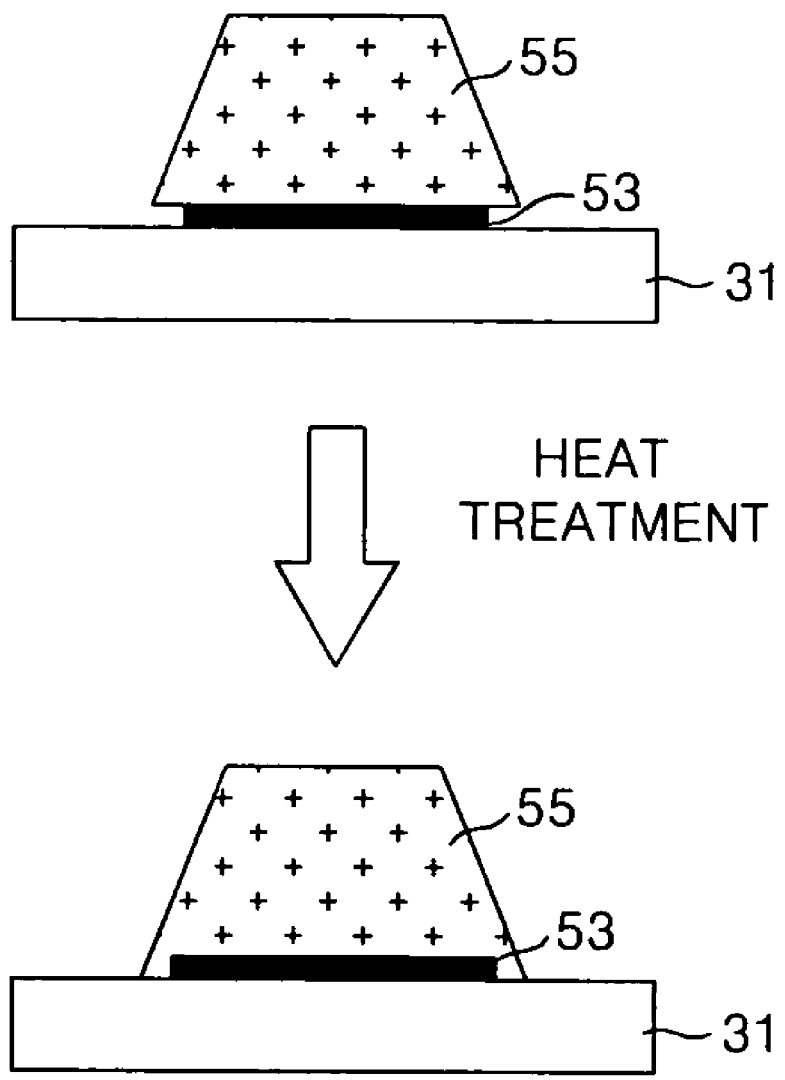
Figure 4C:
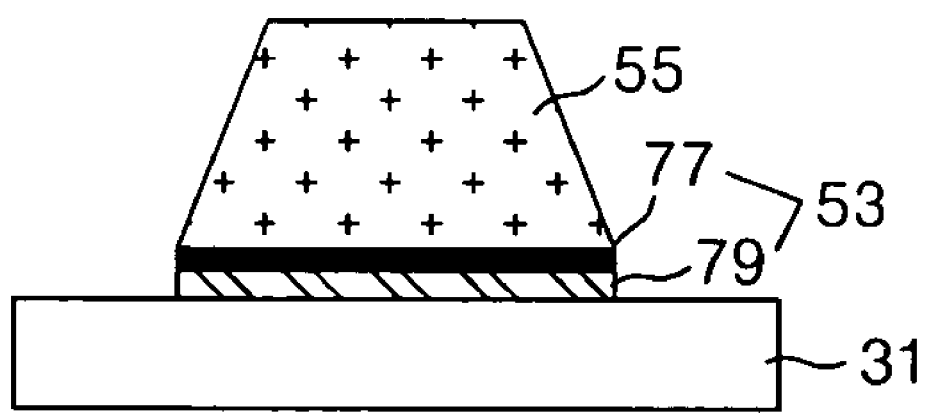

The light shielding layer 53 is formed of an opaque material such as molybdenum (Mo) or chrome (Cr) having a thickness of 500 Å to 1000 Å. The light shielding layer 53, as shown in FIG. 4A, has a width identical to that of the spacer 55. Or, the light shielding layer 53, as shown in FIG. 4B, has a shape with sides that cover the spacer 55. To this end, the light shielding layer 53 is etched more than the spacer 55. The spacer 55 is then cured or is subject to a heat treatment process, to thereby entirely cover the light shielding layer 53 with the spacer 55. Or, the light shielding layer 53, as shown in FIG. 4C, is formed with a double layer of a low reflection metal 77 and an opaque material 79, e.g., $MoO_x$ (a low reflection material)/Mo (an opaque material), $CrO_x$ (a low reflection material)/Cr (an opaque material) or the like.

Figure 5:
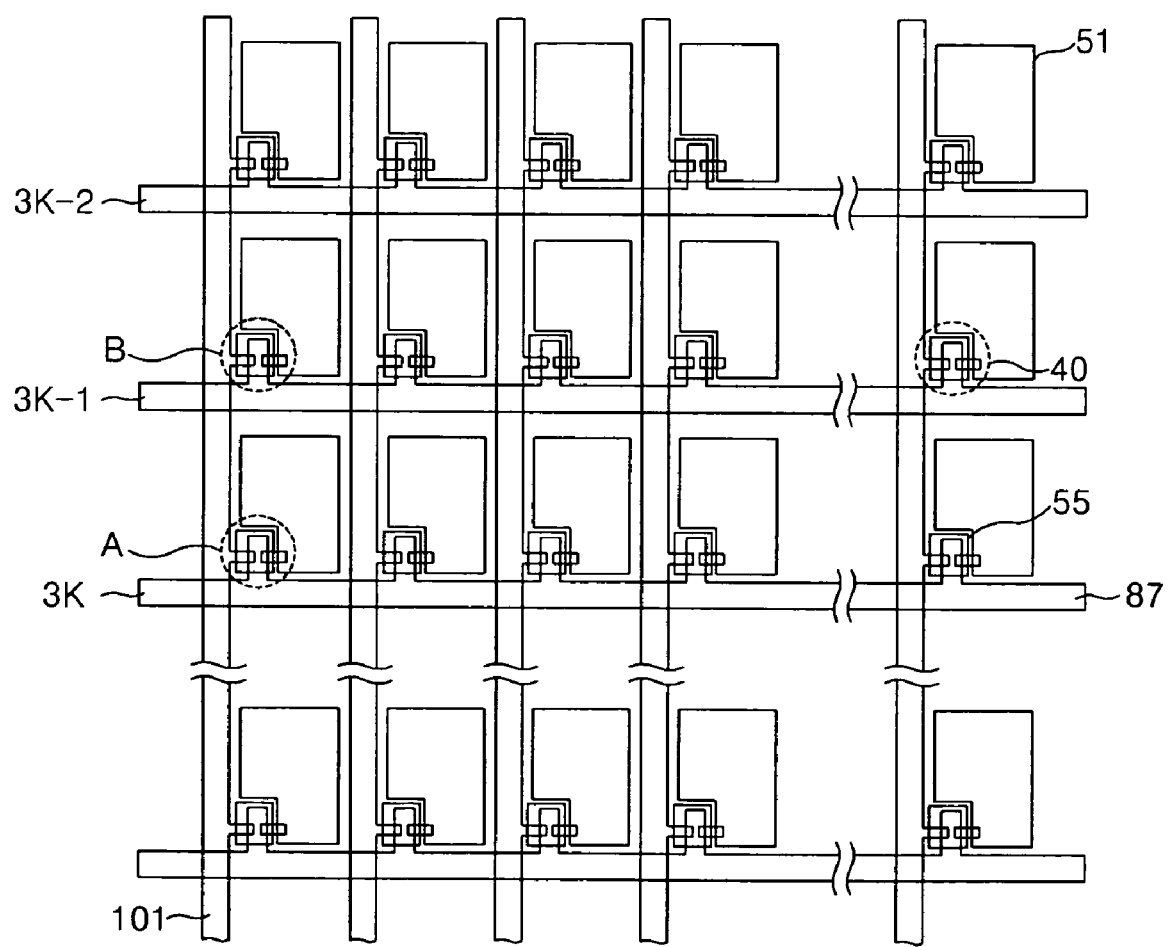
FIG. 5 is a plan view illustrating a second array substrate provided with the spacer.

The spacer 55, as shown in FIG. 5, is formed so as to overlap the thin film transistor 40 on the second passivation film 47. The spacer 55 has a height identical to that of the other spacers. Alternatively, various spacers may have different heights.

Figure 6A:
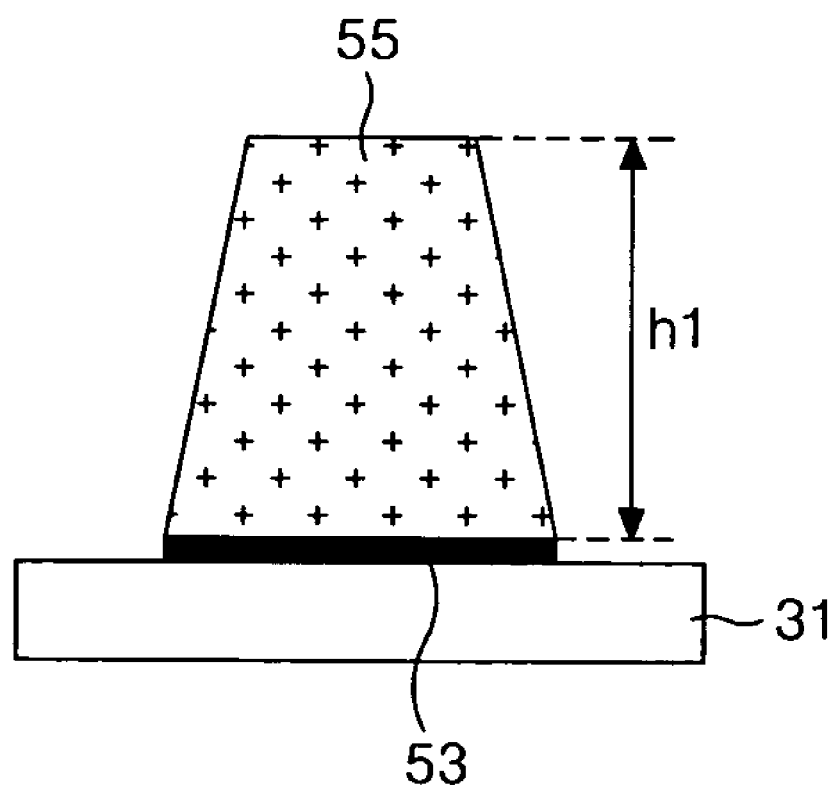
FIGS. 6A and 6B are sectional views illustrating the spacer located at region 'A' and region 'B' shown in FIG. 5.
Figure 6B:
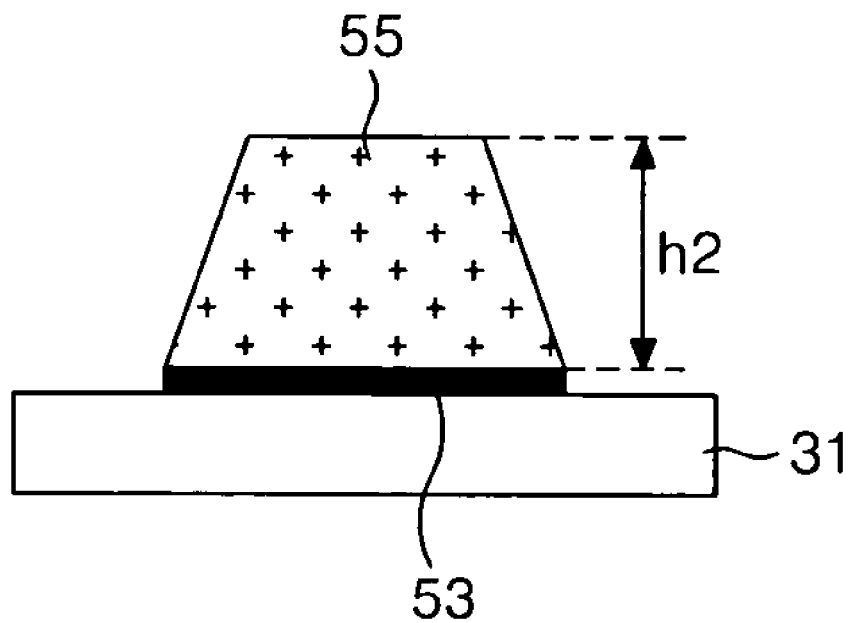

In case where the heights are different from each other, among the spacers with a first height h1 separated from each other by a designated distance, at least one spacer has a second height h2 lower than the first height h1. For instance, the spacer 55 at a region 'A' overlapped with the thin film transistor 40 connected to a $3k^{th}$ (k is the natural number) gate line 87 as shown in FIG. 5 has the first height h1 as shown in FIG. 6A. Whereas, the spacer 55 at a region 'B' overlapped with the thin film transistor 40 connected to a $(3k-2)^{th}$ or a $(3k-1)^{th}$ gate line 87 is formed to have the second height h2 as shown in FIG. 6B. Differences in the spacer heights may be provided as slight adjustments in the relative positions of the substrates becomes difficult due to the frictional strength of the spacers 55 against the upper glass (not shown) upon combining the lower glass with the upper glass when all of the spacers 55 have the same height. Accordingly, the spacer 55 located at the region 'A' maintains a cell gap by being in contact with the upper glass and the spacer located at the region 'B' is made without being in contact with the upper glass, to thereby decrease the friction strength.

The spacers 55 having the first and the second heights h1 and h2 are formed by using a diffraction exposure mask or a partial exposure mask including a semi-transmission film mask. More specifically, each of the spacers having the second height h2 corresponding to the partial exposure region and the spacers 55 having the first height h1 corresponding to the transmission region is formed by patterning a negative photosensitive material through the use of the partial exposure mask defining a shielding region, a partial exposure region and a transmission region. Further, in case where the spacer is formed by use of a positive photosensitive material, each of the spacers having the second height h2 corresponding to the partial exposure region and the spacers 55 having the height h1 corresponding to the shielding region is formed by patterning the positive photosensitive material through the use of the partial exposure mask.

In the liquid crystal display device, an electric field is formed between the pixel electrode 51 to which the pixel signal is supplied via the thin film transistor 40 and a common electrode 63 to which the reference voltage is supplied. The liquid crystal molecules arranged between the first array substrate and the second array substrate are rotated by the electric field due to dielectric anisotropy. Moreover, the light transmittance in the pixel region differs in accordance with a rotation amount of the liquid crystal molecules, thereby permitting pictures to be represented.

As set forth above, the light shielding layer 53 is formed on the same lower glass 31 where the color filter 45 and the thin film transistor 40 are formed. Thus even though misalignment occurs upon combining the lower glass 31 with the upper glass 61, generation of the light leakage current and deterioration of the aperture ratio of the pixel electrode 51 can be prevented. Further, the light shielding layer 53 is simultaneously formed along with the spacer 55, thus, it is possible to simplify the fabricating processes.

FIGS. 7A to 7F are sectional views of a process illustrating a method of fabricating the liquid crystal display device according to the embodiment of the present invention.

Figure 7A:
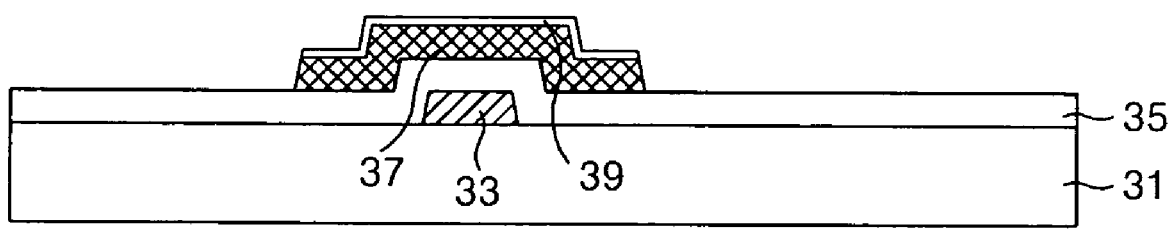
FIGS. 7A to 7F are sectional views of a process illustrating a method of fabricating the liquid crystal display device according to the embodiment of the present invention.

Referring to FIG. 7A, an aluminum gate metal layer is deposited on the transparent lower glass 31 and is patterned by way of photolithography, to thereby form the gate electrode 33. When the gate electrode 33 is formed, the gate line connected to the gate electrode 33 is formed along with a lower gate pad electrode.

Silicon nitride or silicon oxide is deposited on an entire surface of the lower glass 31 so as to cover the gate electrode 33, to thereby form the gate insulating film 35. Also, an amorphous silicon layer and an amorphous silicon layer doped with an impurity are sequentially deposited on the gate insulating film 35, and then are patterned by photolithography so as to remain at a portion corresponding to the gate electrode 33, to thereby form the active layer 37 and the ohmic contact layer 39.

Figure 7B:
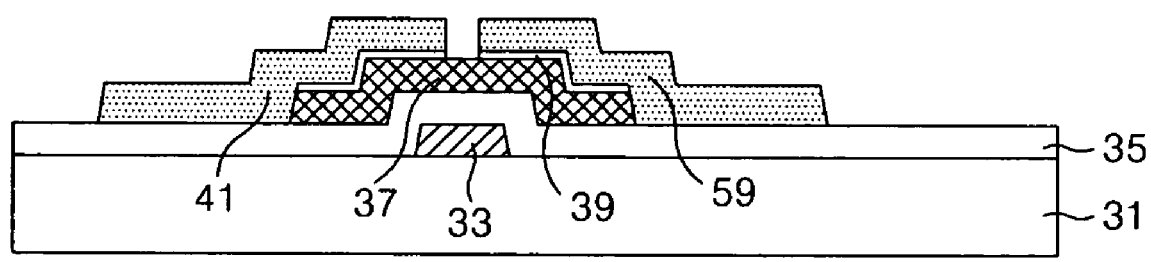

Referring to FIG. 7B, a metal such as molybdenum (Mo), tungsten (W), chrome (Cr) or titanium (Ti) is deposited on an entire surface of the lower glass 31 by chemical vapor deposition (CVD) and then is patterned by photolithography, to thereby form the source electrode 41 and the drain electrode 59. When the source electrode 41 and the drain electrode 59 are formed, the data line crossing the gate line to define the pixel region and a lower data pad electrode are formed together. The data line is connected to the source electrode 41. At this time, the ohmic contact layer 39 between the source electrode 41 and the drain electrode 59 is patterned and then is removed to form the channel.

Figure 7C:
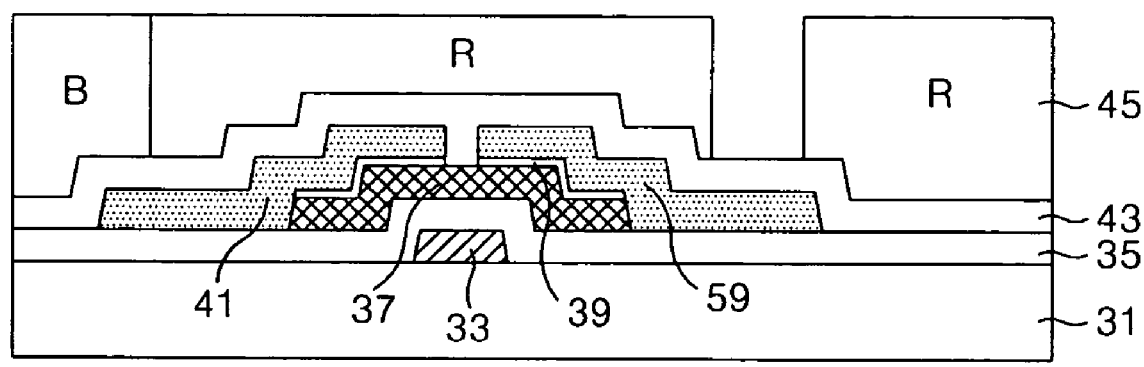

Referring to FIG. 7C, an inorganic insulating film such as silicon oxide or silicon nitride is deposited on the source and the drain electrodes 41 and 59, to thereby form the first passivation film 43.

A photosensitive material capable of filtering red R, green G and blue, e.g., light of red color R, is applied to the first passivation film 43 and then is patterned by an exposure process and a developing process, to thereby form the color filter 45 at the pixel region including the thin film transistor 40. The color filter 45 includes red, green and blue colors, and thus the sequence of applying, exposing and developing is repeated three times, to thereby form the color filter 45 representing each color. Herein, the color filter 45 does not remain at a portion corresponding to the drain electrode 59 and the storage electrode 89 exposed via the contact hole 49 and the second contact hole 75.

Figure 7D:
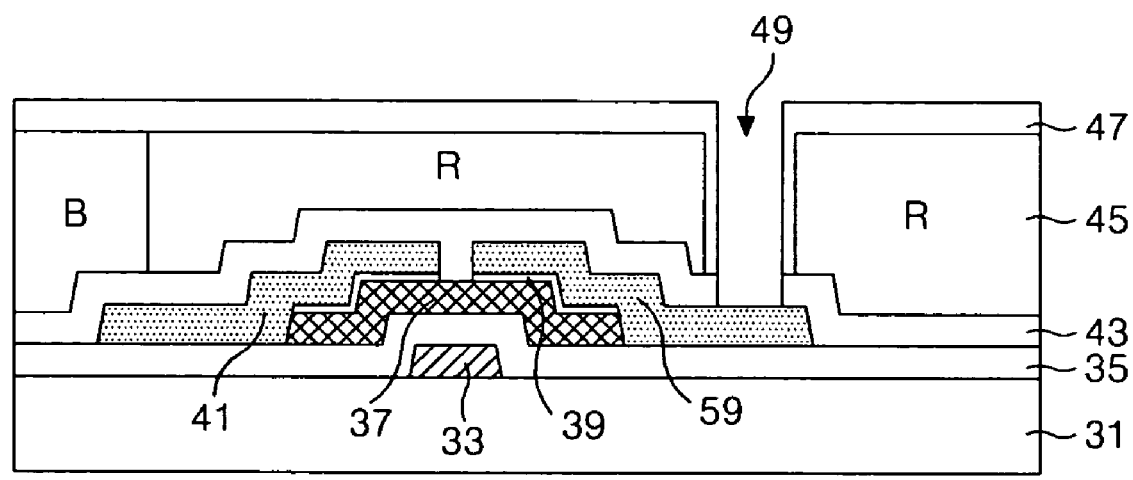

Referring to FIG. 7D, an organic insulating film such as an acrylic organic insulating material or BCB (benzocyclobutene) is coated on the color filter 45, to thereby form the second passivation film 47.

The second passivation film 47 and the first passivation film 43 are sequentially patterned by photolithography, to thereby form the first contact hole 49 exposing the drain electrode 59. When the first contact hole 49 is formed, the second contact hole 75 exposing the storage electrode 89, the third contact hole 83 exposing the lower gate pad electrode 81, and the fourth contact hole 93 exposing the lower data pad electrode 91 are formed.

Figure 7E:
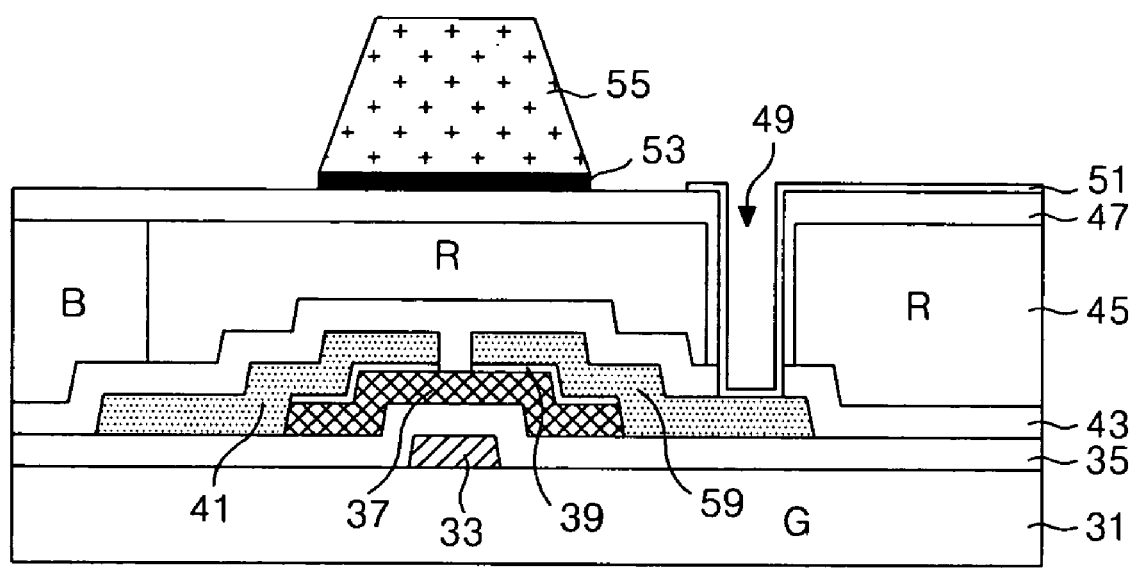

Referring to FIG. 7E, a transparent conductive material such as Indium-Tin-Oxide (ITO) or Indium-Zinc-Oxide (IZO) is deposited on the second passivation film 47 and then is patterned by photolithography, to thereby form the pixel electrode 51. The pixel electrode 51 corresponds to the color filter 45 in a one-to-one relationship and is electrically connected to the drain electrode 59 via the contact hole 49 and to the storage electrode 89 via the second contact hole 75. When the pixel electrode is formed, the upper gate pad electrode 85 electrically connected to the lower gate pad electrode 81 via the third contact hole 83 and the upper data pad electrode 95 electrically connected to the lower data pad electrode 91 via the fourth contact hole 93 are formed.

The light shielding layer 53 is formed by depositing an opaque material such as molybdenum (Mo) or chrome (Cr) in a thickness of 500 Å to 1000 Å through sputtering on a second passivation film 47. The light shielding layer 53 may be formed with a double layered structure of a low reflection metal and an opaque material, e.g., $MoO_x$ and Mo or $CrO_x$ and Cr.

A resin is applied to the light shielding layer 53 and is then exposed and developed to expose the light shielding layer 53, to thereby form a spacer 55 at a portion corresponding to the thin film transistor 40. The applied resin is exposed by diffraction exposure. Accordingly, the spacers 55 are formed with different heights from each other.

The exposed portion of the light shielding layer 53 is etched by using the spacer 55 as a mask and then is removed. At this time, the light shielding layer 53 is etched to be undercut by wet-etching or dry-etching. The light shielding layer 53 and the spacer 55 are formed in one mask process and therefore, the number of fabricating processes is reduced. The spacer 55 then is cured or is subjected to a heat treatment. At this time, a portion of the spacer 55 is melted to flow, to thereby cover a lateral surface of the light shielding layer 53.

As set forth above, the thin film transistor 40, the color filter 45 and the pixel electrode 51 are formed on the lower glass 31 and therefore, the second array substrate 110 of the liquid crystal display device is completed.

Figure 7F:
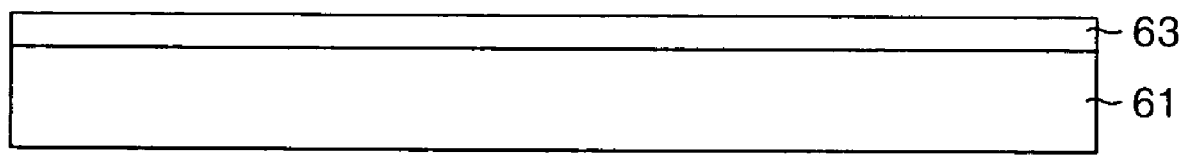

Referring to FIG. 7F, a transparent conductive metal is deposited on the upper glass 61, to thereby form the common electrode 63. The common electrode 63 is formed on the upper glass 61, to thereby complete the first array substrate 100.

Although not shown in FIG. 7, the second array substrate 110 is combined with the first array substrate 100, and the liquid crystal material is injected into a space formed by the spacer 55, to thereby form the liquid crystal layer 65. The light shielding layer 53 is formed on the same lower glass 31 where the color filter 45 and the thin film transistor 40 are formed. Therefore, even though misalignment occurs upon combining the lower glass with the upper glass, generation of the light leakage current and deterioration of the aperture ratio of the pixel electrode 51 can be prevented. Further, the light shielding layer 53 is formed by use of the same photolithography employed to make the spacer 55, thus, it is possible to simplify processes.

Figure 8:
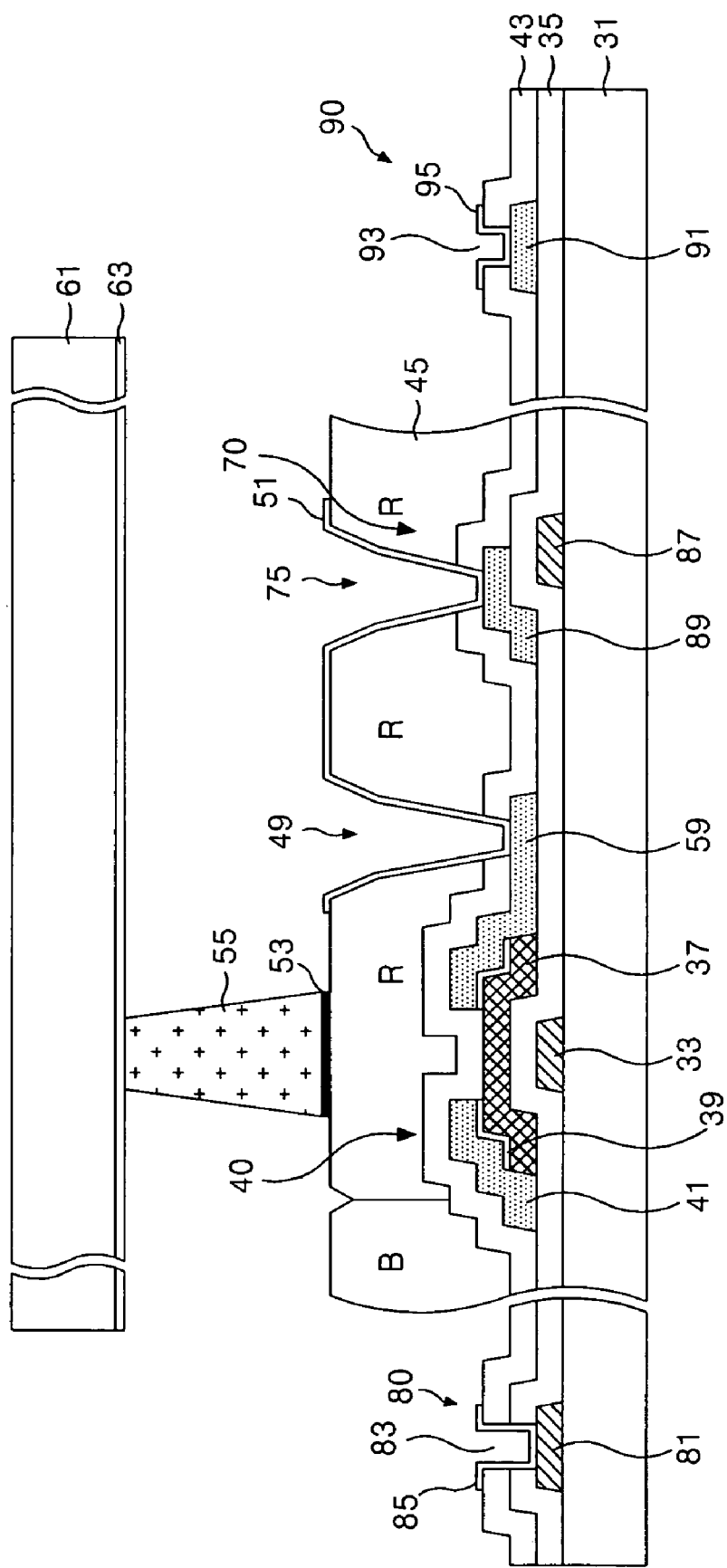
FIG. 8 is a sectional view illustrating a liquid crystal display device having a TOC structure according to a second embodiment of the present invention.

FIG. 8 is a sectional view illustrating a liquid crystal display device having a COT structure according to a second embodiment of the present invention.

Referring to FIG. 8, the liquid crystal display device having a COT structure according to a second embodiment of the present invention includes configuration elements identical to those of the liquid crystal display device except that the second passivation film in the embodiment shown in FIG. 3 is removed from the liquid crystal display device. This decreases the thickness of the liquid crystal display device as the second passivation film is formed using a relatively thick organic insulating material. Therefore, a detailed explanation for the identical configuration elements will be omitted for the sake of simplicity.

The pixel electrode 51, which is connected to the drain electrode 59 of the thin film transistor 40 via the first contact hole 49 passing through the passivation film 43, is formed in the pixel region.

The color filter 45 is formed at the pixel region to correspond to the pixel electrode in a one-to-one relationship. The color filter 45 is formed at a portion corresponding to the drain electrode 59 and the storage electrode 89 exposed via a first contact hole 49 and a second contact hole 75.

The gate pad 80 includes a lower gate pad electrode 81 extending from the gate line 87, and an upper gate pad electrode 85 connected, via a third contact hole 83 passing through the gate insulating film 35 and the passivation film 43, to the lower gate pad electrode 81.

The data pad 90 includes a lower data pad electrode 91 extending from the data line, and an upper data pad electrode 95 connected, via a fourth contact hole 93 passing through the passivation films 43, to the lower data pad electrode 91.

The spacer 55 and the light shielding layer 53 are patterned by photolithography and are formed at a portion corresponding to the thin film transistor 40.

In a method of the liquid crystal display device shown in FIG. 8, the thin film transistor 40 and the color filter 45 are formed on the substrate by use of the fabricating method shown in FIG. 7C. Herein, the color filter 45 is formed at a portion corresponding to the drain electrode 59 and the storage electrode 89 being exposed via the first and the second contact holes 49 and 75.

Thereafter, the first to the fourth contact holes 49, 75, 83 and 93 passing through the passivation film 43 are formed. A transparent conductive material is deposited on the substrate provided with the first to the fourth contact holes 49, 75, 83 and 93, and then is patterned, to thereby form the upper gate pad electrode 85, the pixel electrode 51 and the upper data pad electrode 95.

An opaque metal and an organic insulating material are sequentially formed on the lower glass 31 provided with the pixel electrode 95, and is then patterned, to thereby form the spacer 55 and the light shielding layer 53.

Figure 9:
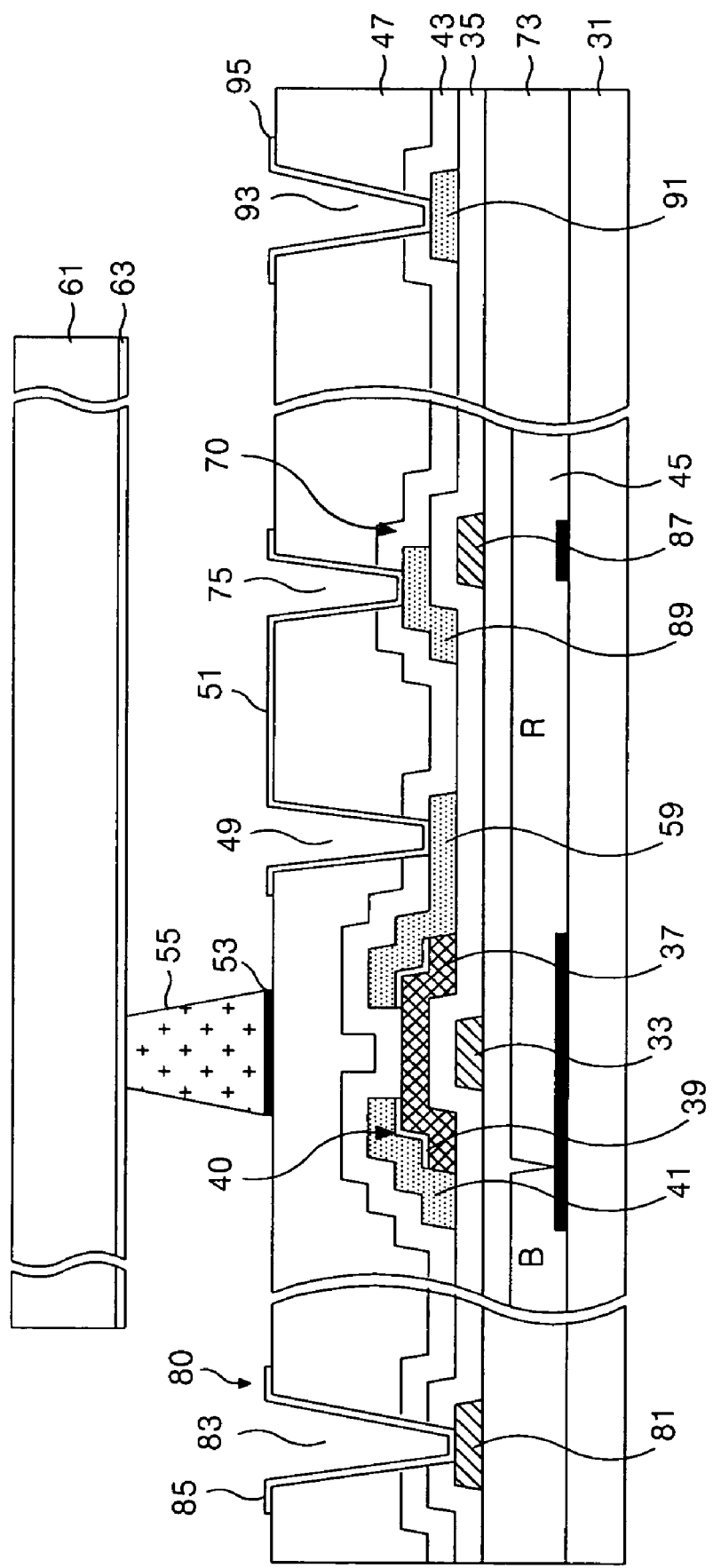
FIG. 9 is a sectional view illustrating a liquid crystal display device having a COT structure according to a third embodiment of the present invention.

FIG. 9 is a sectional view illustrating a liquid crystal display device having a thin film transistor on color filter (TOC) structure according to a third embodiment of the present invention.

In the liquid crystal display device having the TOC structure shown in FIG. 9, a separate light shielding layer is formed at a portion corresponding to the thin film transistor 40 on the lower glass 31 and a lower passivation 73 is formed on the lower glass 31. The lower passivation 73 is made of an inorganic insulating material such as silicon oxide or silicon nitride, or an organic insulating material such as an acrylic resin or BCB (benzocyclobutene) The thin film transistor 40 is formed at an upper portion of the lower glass 31.

In the liquid crystal display device having the TOC structure as described above, the light shielding layer 53 is formed at the same lower glass 31 on which the color filter 45 and the thin film transistor 40 are formed, thus, even though misalignment occurs upon combining the lower glass 31 with the upper glass 61, generation of the light leakage current and deterioration of the aperture ratio of the pixel electrode 51 can be prevented.

The method of fabricating the liquid crystal display device shown in FIG. 9 is will be described as follows.

First of all, resins for a red color, a green color and a blue color are sequentially formed on the lower glass 31, to thereby form a red, a green and a blue color filter 45. A light shielding layer may be formed before the formation of the color filter 45. An organic insulating material is coated on the lower glass 31 provided with the color filter 45, to thereby form the lower passivation film 73. A gate metal layer is deposited on the lower glass 31 provided with the lower passivation film 73, and then is patterned by photolithography and etching, to thereby form a gate pattern including the gate line 87, the gate electrode 33 and the lower gate pad electrode 81. An insulating material is deposited to cover the gate pattern, to thereby form the gate insulating film 35. A first semiconductor material and a second semiconductor material are sequentially deposited on the gate insulating film 35, and are then patterned, to form a semiconductor pattern including the active layer 37 and the ohmic contact layer 39. A data metal layer is deposited on the gate insulating film 35 provided with the semiconductor pattern, and then is patterned, to thereby form a data pattern including the source electrode 41, the drain electrode 59, the data line, the storage electrode 89 and the lower data pad electrode 91. An insulating material is deposited on the gate insulating film provided with the data pattern, and then is patterned, to thereby form the first and the second passivation films 43 and 47 having the first to the fourth contact holes 49, 75, 83 and 93. A transparent conductive film including ITO, IZO or the like is deposited on the second passivation film 47, and then is patterned, to thereby form the upper gate pad electrode 85, the pixel electrode 51 and the upper data pad electrode 95.

An opaque metal and an organic insulating material are sequentially formed on the lower glass 31 provided with the pixel electrode 95, and then are patterned, to thereby form the spacer 55 and the light shielding layer 53.

As described above, according to the present invention, the light shielding layer for shielding the light leakage current at the channel region of the thin film transistor is formed on the lower glass on which the thin film transistor and the color filter are formed, by using the same mask process employed to make the spacer.

Accordingly, since the light shielding layer is formed by using the same mask process employed to make the spacer, the number of the processes can be reduced. Thus, it is possible to improve a production yield. Further, since the light shielding layer is formed to overlap the thin film transistor with the organic insulating material having a small dielectric constant therebetween, the capacitance of the parasitic capacitor is small. Accordingly, it is possible to prevent signal distortion caused by the parasitic capacitor.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
    a first array substrate;
    a second array substrate facing the first array substrate and having a thin film transistor and a color filter formed thereon;
    a spacer formed between the first and the second array substrates maintaining a cell gap between the first and the second array substrates; and
    a light shielding layer with a pattern substantially identical to the spacer formed on the second array substrate having the thin film transistor at a lower portion of the spacer, made contact with the spacer and overlapped with the thin film transistor,
    wherein the light shielding layer and the spacer are concurrently patterned and contact each other, and
    wherein the spacer includes first spacers having a first height and second spacers having a second height lower than the first height, and at least one the second spacers is formed between the first spacers.

2. The liquid crystal display device according to claim 1, wherein the light shielding layer comprises an opaque metal.

3. The liquid crystal display device according to claim 2, wherein the opaque metal comprises at least one of molybdenum (Mo) and chrome (Cr).

4. The liquid crystal display device according to claim 1, wherein the light shielding layer comprises a multiple layer structure containing a first layer having a low reflection material and a second layer having an opaque material.

5. The liquid crystal display device according to claim 1, the light shielding layer has a thickness of 500 Å to 1000 Å.

6. The liquid crystal display device according to claim 1, wherein the second array substrate includes:
    a gate electrode of the thin film transistor and a gate line connected to the gate electrode;
    a gate insulating film covering the gate electrode and the gate line;
    a semiconductor pattern on the gate insulating film, the semiconductor pattern overlapping the gate electrode;
    a source electrode of the thin film transistor, a drain electrode of the thin film transistor, and a data line crossing the gate line, formed on the gate insulating film;
    a first passivation film formed between the color filter and the thin film transistor; and
    a pixel electrode on the color filter, the pixel electrode connected to the drain electrode.

7. The liquid crystal display device according to claim 6, further comprising a second passivation film containing an organic insulating material covering the color filter.

8. The liquid crystal display device according to claim 1, wherein the second array substrate includes:
    a substrate on which the color filter and the thin film transistor are formed;
    a lower passivation film covering the color filter;
    a gate electrode of the thin film transistor and a gate line connected to the gate electrode formed on the lower passivation film;
    a gate insulating film covering the gate electrode and the gate line;
    a semiconductor pattern overlapping the gate electrode, the semiconductor pattern on the gate insulating film;
    a source electrode of the thin film transistor, a drain electrode of the thin film transistor, and a data line crossing the gate line, formed on the gate insulating film;
    an upper passivation film on the thin film transistor; and
    a pixel electrode connected to the drain electrode on the upper passivation film.

9. A liquid crystal display device comprising:
    a first array substrate;
    a second array substrate facing the first array substrate and having a thin film transistor and a color filter formed thereon;
    a spacer formed between the first and the second array substrates maintaining a cell gap between the first and the second array substrates; and a light shielding layer having a footprint substantially identical to that of the spacer, the light shielding layer formed between the spacer and the thin film transistor, made contact with the spacer and overlapping the thin film transistor.

10. The liquid crystal display device according to claim 9, further comprising a passivation film formed between the thin film transistor and the spacer, the light shielding layer formed between the spacer and the passivation film.

11. The liquid crystal display device according to claim 10, wherein the color filter is formed between the thin film transistor and the passivation film.

12. The liquid crystal display device according to claim 10, wherein the thin film transistor is formed between the color filter and the passivation film.

13. The liquid crystal display device according to claim 10, wherein the light shielding layer completely overlaps a channel of the thin film transistor.

14. The liquid crystal display device according to claim 10, wherein the light shielding layer is formed only between the spacer and the passivation film.

15. The liquid crystal display device according to claim 9, wherein the color filter is formed between the thin film transistor and the light shielding layer.

16. The liquid crystal display device according to claim 15, wherein the light shielding layer contacts the color filter.

17. The liquid crystal display device according to claim 16, wherein the light shielding layer completely overlaps a channel of the thin film transistor.

18. The liquid crystal display device according to claim 15, wherein the light shielding layer is formed only between the spacer and the thin film transistor.

19. The liquid crystal display device according to claim 9, the second array substrate further comprising:
a base substrate on which the color filter and the thin film transistor are formed; and
an additional light shielding layer formed between the thin film transistor and the base substrate.

20. The liquid crystal display device according to claim 19, wherein the color filter is formed between the thin film transistor and the additional light shielding layer.

21. The liquid crystal display device according to claim 19, wherein both the light shield layer and the additional light shielding layer completely overlap a channel of the thin film transistor.

22. The liquid crystal display device according to claim 9, wherein the light shielding layer has an identical footprint as that of the spacer.

23. The liquid crystal display device according to claim 9, wherein the light shielding layer is closer to the thin film transistor than all of the spacer.

24. The liquid crystal display device according to claim 9, wherein sides of the light shielding layer are surrounded by the spacer.

25. The liquid crystal display device according to claim 9, wherein the light shielding layer comprises a multiple layer structure containing a first layer having a low reflection material and a second layer having an opaque material.

26. The liquid crystal display device according to claim 9, wherein the spacer includes first and second spacers having different heights.

27. The liquid crystal display device according to claim 9, wherein the spacer and the light shielding layer are formed from different materials.

* * * * *